United States Patent [19]
Getselev

[11] 3,773,101
[45] Nov. 20, 1973

[54] DEVICE FOR CONTINUOUS AND SEMI-CONTINUOUS CASTING OF METAL HAVING AN INDUCTOR

[76] Inventor: Zinovy Naumovich Getselev, prospekt Metallurgov, 73, kv. 29, Kuibyshev, U.S.S.R.

[22] Filed: Nov. 10, 1971

[21] Appl. No.: 197,268

[52] U.S. Cl. .......................... 164/251, 164/283 M
[51] Int. Cl. ............................................. B22d 27/02
[58] Field of Search ..................... 164/51, 82, 251, 164/281, 49

[56] References Cited
UNITED STATES PATENTS

| | | |
|---|---|---|
| 3,268,963 | 8/1966 | Mann .................................. 164/51 |
| 3,467,166 | 9/1969 | Getselev et al. ................ 164/250 X |
| 3,605,865 | 9/1971 | Getselev ........................... 164/250 |
| 2,763,040 | 9/1956 | Korb .................................. 164/49 |

FOREIGN PATENTS OR APPLICATIONS 1,803,473  5/1970  Germany ............................. 164/51

*Primary Examiner*—R. Spencer Annear
*Attorney*—Holman & Stern

[57] ABSTRACT

A plant for producing ingots from molten metal poured on a tray and formed by the influence of an electromagnetic field of an inductor said inductor being located in a space of a collector and the ingot being immersed in a cooling agent as it is discharged from holes in the collector onto the side surface of the ingot.

4 Claims, 2 Drawing Figures

PATENTED NOV 20 1973

3,773,101

DEVICE FOR CONTINUOUS AND SEMI-CONTINUOUS CASTING OF METAL HAVING AN INDUCTOR

The invention relates to devices for producing ingots from molten metal in continuous (or) plants for casting metal, for example aluminium.

Known in the prior art are ingot-producing plants comprising an inductor which creates an electromagnetic field to form molten metal into an ingot. The molten metal is delivered on a tray and the side surface of the ingot being formed is cooled by cooling agent e.g., water fed from collector having a reservoir therein. The collector embraces the ingot laterally, serves as the body of the plant, has a space for a cooling agent and holes for the discharge of the cooling agent through the wall facing the ingot.

A shield secured on the collector at the side of the ingot serves for directing the cooling agent (water) onto the side surface of the ingot and for correcting the electromagnetic field.

In prior art ingot-producing plants the inductor is mounted under the collector and is fastened and aligned by dielectric parts. Experience gained in the practical use of ingot-producing plants proves that the inductor must be reliably insulated so as to ward off any accidents that might occur through inadvertent contact. Besides a separate water inlet is provided for cooling the inductor. All these factors make servicing of the plant difficult and dangerous.

The main object of the invention is to provide an ingot-producing plant which would be safe in service to eliminate the possibility of contact with the inductor by accident.

Another object of the invention is to simplify the manufacture of the plant.

Still another object is to make the plant more compact.

And a further object is to cancel the additional equipment for cooling the inductor.

This object has been achieved by providing a plant for producing ingots from molten metal fed onto a tray and formed into an ingot by the electromagnetic field of an inductor secured to the collector, the latter serving as the body of the plant, embracing the ingot laterally, having a reservoir for the cooling agent, holes for the discharge of the cooling agent said holes being located in the collector wall facing the ingot, and a shield for preventing contact with the electromagnetic field of the inductor were, according to the invention, said inductor being located in the space or reservoir of the collector and immersed in the cooling agent.

Such a plant is safer in servicing, more reliable, compact and simpler to manufacture.

It is desirable that the inductor should be located near the collector wall facing the ingot. This will ensure a sufficiently high efficiency of the plant.

It is practicable that the inductor should be located near the vertical partition which can be placed along the reservoir space in order to suppress the turbulent streams of the cooling agent.

Such position of the inductor is rational considering the presence of the row of discharge holes on the reservoir wall adjoining the ingot.

The shield can be placed into the collector space above the inductor which will make the plant more compact.

Now the invention will be described in detail by way of example with reference to the accompanying drawings in which.

Figure 1:
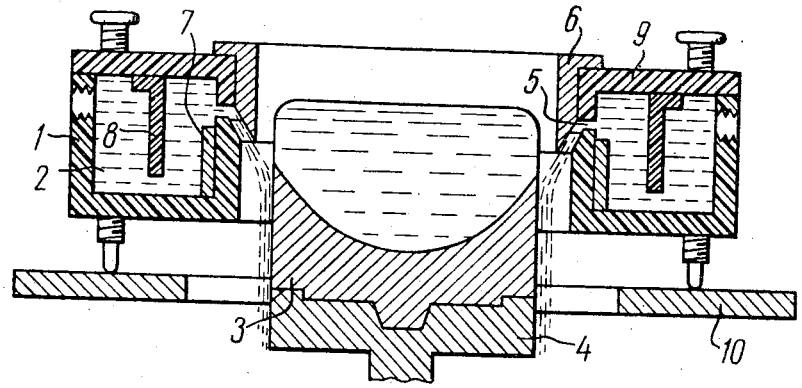
FIG. 1 shows the ingot-producing plant with the inductor being located at the inner wall of the collector, sectionalized vertically.
Figure 2:
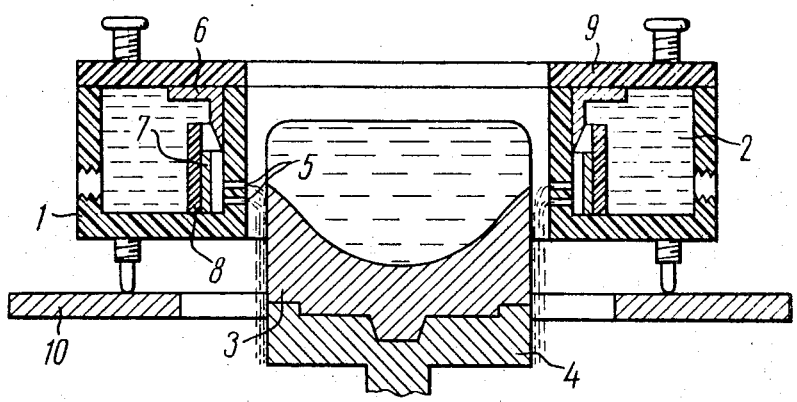
FIG. 2 shows the ingot-producing plant with the inductor being located at the inner partition of the collector, sectionalized vertically.

The ingot-producing plant used in the process of continuous or semicontinuous casting of metal comprises a collector 1 (FIGS. 1 and 2) which serves as a body of the plant and has a space 2 forming a reservoir for the cooling agent. The collector 1 embraces laterally the ingot 3 which is held by the tray 4 moved in a vertical direction.

The ingot-facing side of the collector 1 is provided with holes 5 for the discharge of the cooling agent and a shield 6 for preventing contact with the electromagnetic field of an inductor 7 and directing the cooling agent onto the ingot 3.

The inductor 7 is immersed in the cooling agent contained in the space 2 of the collector 1 and creates the electromagnetic field which turns the column of molten metal on the tray 4 into the ingot 3.

The inductor 7 can be located close to the wall of the collector 1 at the side of the ingot 3 or near the vertical partition 8 extending along the space 2 of the collector 1 and intended to suppress the turbulent streams of the cooling agent. In the latter case the space 2 of the collector 1 can accommodate a shield 6 installed above the inductor 7.

The collector 1 and its cover 9 are made of a dielectric material, e.g., textolite or fibreglass which ensure reliable electrical insulation of the inductor 7. The collector 1 is installed on the base support 10.

Determination of the position of the inductor 7 in the space 2 of the collector 1 depends on the position and the number of holes 5 for the discharge of the cooling agent.

The plant operates as follows.

The cooling agent is supplied from some source into the collector 1 at a controlled pressure and rate. The tray 4 is moved into position with respect to the shield 6 so as to direct the flow of the cooling agent onto the side surface of said tray and ingot. The electromagnetic field of the inductor 7 is insulated by the shield 6.

Then molten metal is poured on the tray 4 where it is formed into an ingot 3 by the electromagnetic field built up by the inductor 7. The cross section of the ingot 3 can be varied by selecting the required shape of the inductor 7.

As the metal reaches a certain level on the tray 4, the latter is moved down relative to the shield 6 thus building up the ingot 3 continuously with the molten metal.

The cooling agent flows from the holes 5 of the collector 1 directly onto the side surface of the ingot or drips down from the outer surface of the shield 6 thus contributing to the solidification of the ingot 3.

As the ingot 3 grows, the tray 4 is lowered until the required length of the ingot is obtained. Meanwhile, the cooling agent (water) in the space 2 of the collector 1 cools down the inductor 7 and is discharged for cooling the ingot. As a result, there is no need for a separate supply of the cooling agent to the inductor 7 and the latter need not be insulated.

The process of casting can be accompanied by adjustments of the pressure and rate of flow of the cooling agent, voltage across the inductor 7, vertical speed of the tray 4, and metal level relative to the inductor 7.

To terminate the process of metal casting, the supply of metal and the movement of the ingot are discontinued, and the ingot is brought to the crystallization stage, then the inductor 7 is turned off and the delivery of the cooling agent is stopped.

Tests have proven the reliable functioning of the plant and its complete electrical safety.

What is claimed is:

1. An ingot-producing plant comprising: a tray on which the molten metal is poured to be formed into an ingot; a collector which serves as the body of said plant, surrounding the ingot laterally and having a space for the cooling agent and holes for the discharge of said cooling agent, said holes being located on the ingot-facing side, a vertical partition located within the space for the cooling agent and surrounding the ingot laterally for suppressing turbulent streams of coolant; an inductor located in the space of said collector on the ingot side of said partition and surrounding the ingot laterally, the inductor being immersed into the cooling agent and intended to build up an electromagnetic field which forms molten metal into an ingot; and a shield secured to said collector at the side of the ingot, the tray being positioned below the level of the holes in the collector for discharge of cooling agent, so that the cooling agent is discharged onto the side surfaces of the tray and the ingot as it is formed.

2. The plant of claim 1 wherein said inductor is located contiguous to the ingot-facing wall of said collector.

3. The plant of claim 1 wherein said inductor is located contiguous to the vertical partition extending along the collector space and intended to suppress the turbulent streams of the cooling agent.

4. The plant of claim 3 wherein the shield is located in the collector space above the inductor.

* * * * *